H. A. BRASSERT & W. MATHESIUS.
METHOD OF AND APPARATUS FOR RECOVERING SLUDGE.
APPLICATION FILED DEC. 8, 1915.
1,171,696.
Patented Feb. 15, 1916.
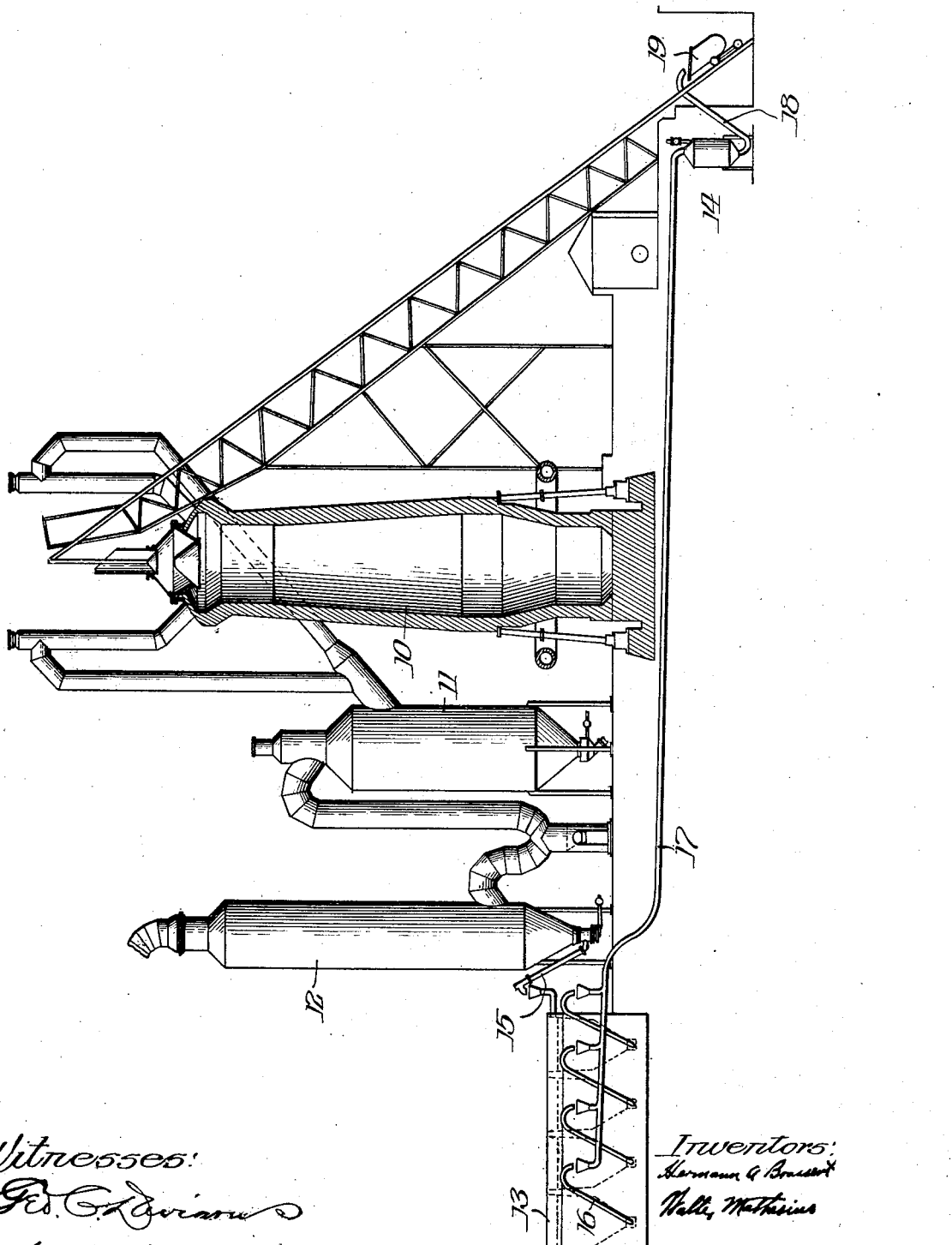

UNITED STATES PATENT OFFICE.

HERMANN A. BRASSERT AND WALTHER MATHESIUS, OF CHICAGO, ILLINOIS.

METHOD OF AND APPARATUS FOR RECOVERING SLUDGE.

1,171,696. Specification of Letters Patent. Patented Feb. 15, 1916.

Application filed December 8, 1915. Serial No. 65,751.

*To all whom it may concern:*

Be it known that we, HERMANN A. BRASSERT and WALTHER MATHESIUS, both citizens of the United States, residing at Chicago, in the county of Cook and State of Illinois, have invented certain new and useful Improvements in Methods of and Apparatus for Recovering Sludge, of which the following is a specification.

Heretofore the waste water from such washers has been wasted, carrying off a large and valuable amount of metallic oxids in solution, besides being a source of considerable trouble and interference through obstructing sewers, rivers and lakes, and polluting the water supply of communities.

Many attempts have been made to settle the sludge by gravity, through the use of various kinds of settling ponds. Such installations have been wasteful of space, and expensive in the removal of the sediment, due to the nature of the sediment to be removed, which, owing to its semi-liquid condition, is difficult to handle by mechanical means, such as grab buckets, and to transport in railroad cars. This difficulty can only be overcome through allowing the sediment to first dry out for a considerable length of time. This is prohibitive, owing to the time and large space required, which is usually not available at industrial plants. Some systems have been installed for the purpose of piping this sludge to distant unoccupied acreage, there to be wasted, or dried and stored for future use. None of these systems has succeeded in making the sludge economically available for immediate use.

The purpose of our invention is to provide a simple method whereby the iron bearing sediment is recovered and put to immediate beneficial use.

In carrying out our invention we automatically collect the iron bearing sludge from the waste water, carry it in its original state directly to the blast furnace charging apparatus, and mix it with the furnace burden. The advantage we claim for this method is that the iron contents of the sludge are entirely recovered, and at the same time the production of flue dust from the furnace is materially reduced. It is the general practice at furnaces smelting fine ores, to add water to the charges for this purpose. It will readily be seen that water cannot be as efficient as the sludge since part of the water is not absorbed by the burden and evaporates in the furnace top without having fulfilled its purpose. The sludge, on the other hand, represents an intimate mixture of water and solids, and forms a wet blanket on the burden of fine ores; its addition to the burden does not increase the dead weight of the furnace charge, as the water does, but through its iron contents adds to the productive portion of the burden. Thereby the yield of iron from the furnace is increased and the cost is correspondingly decreased. Our method, therefore, clearly fulfils three purposes: It efficiently and cheaply removes the sludge from the water; it cheaply delivers the sludge back to the blast furnace for immediate use; and it improves the operation and the yield of the blast furnace and thereby lowers the cost of manufacture.

The invention will be more readily understood by reference to the accompanying drawings in which the figure is a typical layout of a plant arranged to utilize our method and apparatus.

In the drawings, the blast furnace is indicated at 10, the dust catcher at 11, the gas washer at 12, the settling tank at 13, and a storage tank at 14. It will be understood that the gas generated in the blast furnace passes into the dust catcher 11, where the heavier particles of solid matter are removed, whereupon it passes to the gas washer and all the foreign matter is removed therefrom. The solid matter which is washed out includes a relatively large quantity of fine ores, or oxids. These solid particles fall to the lower portion of the gas washer and are discharged through the outlet 15 into the settling tank 13. The outlets 16 from the settling tank are at their lower ends the solid matter settling to the bottom and being discharged, passing from the outlet pipes 16 to a long pipe, or conveyer, 17 into the storage tank 14. An outlet pipe 18 from the storage tank is located in proximity to the skip tub 19. At the proper time a valve may be opened and a quantity of the sludge discharged into the tub, whereby it is carried to the top of the blast furnace on the skip and dumped into the top of the furnace.

By means of the simple arrangement shown, it is possible to wet down the furnace burden to better advantage than if water were used and, at the same time, to save a large quantity of relatively valuable ore which had heretofore been permitted to go to waste. The apparatus necessary to carry out the method is very simple and will require practically no attention after having once been started in operation.

We claim:

1. The method of utilizing the sludge from gas washers, which consists in discharging the washed water of a gas washer into a settling tank, removing the sludge by gravity from the bottom of said settling tank, conveying the sludge to the bottom of the skip hoist of a blast furnace, then discharging said sludge into the blast furnace, substantially as described.

2. Apparatus of the character described, comprising in combination a blast furnace, a gas washer, a settling tank, and means for conveying the sludge collected in said settling tank to the top of said blast furnace and there combining the same with the furnace burden, substantially as described.

3. In apparatus of the character described, the combination of a blast furnace, a gas washer, a settling tank, means for discharging the wash water from the washer into said settling tank, means for discharging the sludge from the bottom of said settling tank, means for conveying said sludge to the hoist for said blast furnace, and means for hoisting said sludge to the top of said blast furnace and there combining it with the furnace burden, substantially as described.

Signed at Chicago, Illinois, this 2nd day of December, 1915.

HERMANN A. BRASSERT.
WALTHER MATHESIUS.

Witnesses:
D. V. MEDALIE,
C. J. BACON.

Copies of this patent may be obtained for five cents each, by addressing the "Commissioner of Patents, Washington, D. C."